Aug. 17, 1926.
W. G. RICKMAN
1,596,023
DIAPHRAGM INDICATOR FOR CAMERAS
Filed August 10, 1922   2 Sheets-Sheet 1
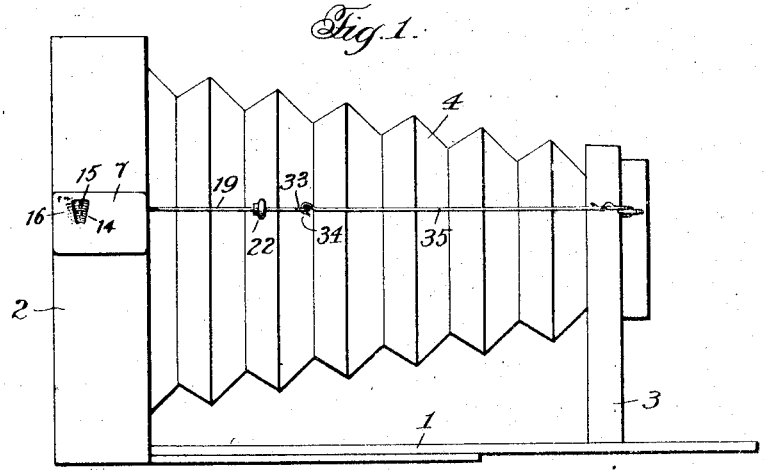
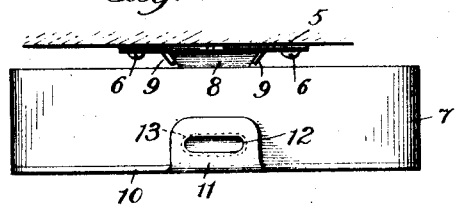
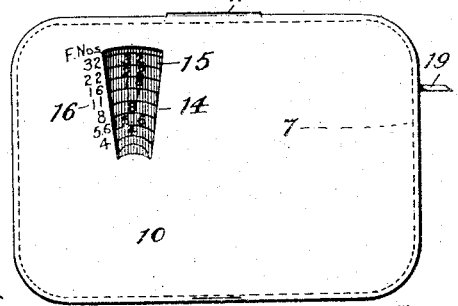
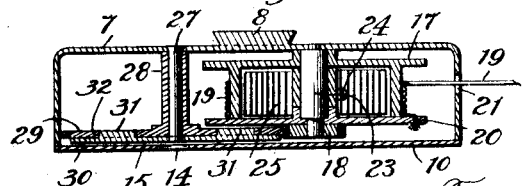
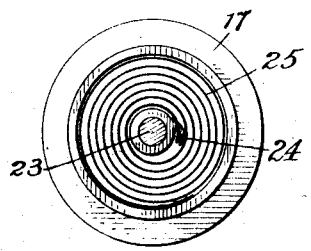
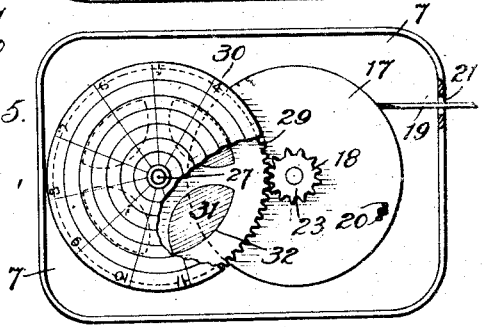
Witness:
Jas E Hutchinson
Inventor:
William George Rickman,
By Milans & Milans
Attorneys Aug. 17, 1926. 1,596,023
W. G. RICKMAN
DIAPHRAGM INDICATOR FOR CAMERAS
Filed August 10, 1922 2 Sheets-Sheet 2
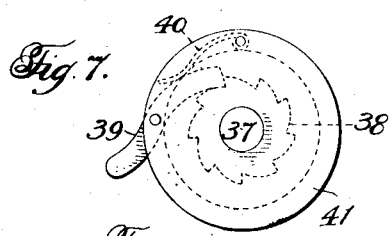
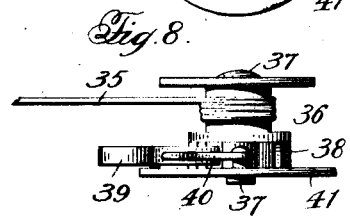
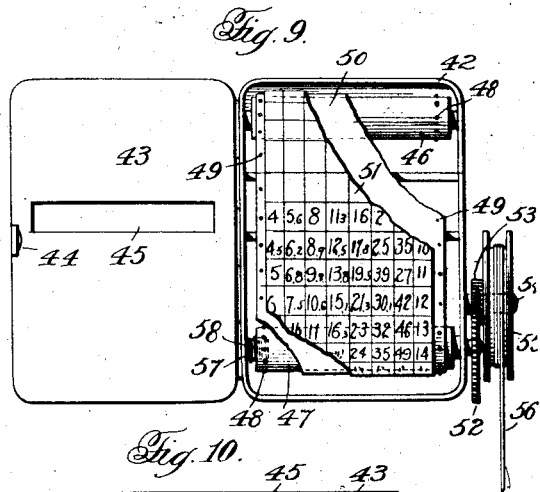
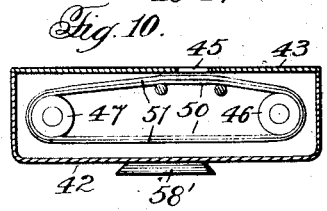
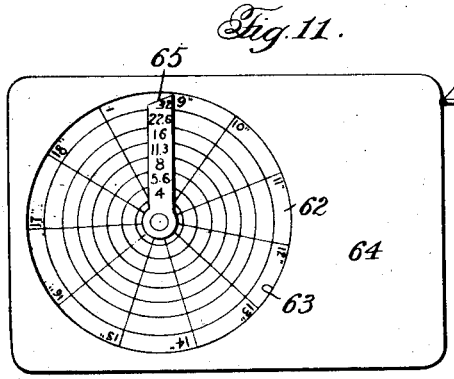
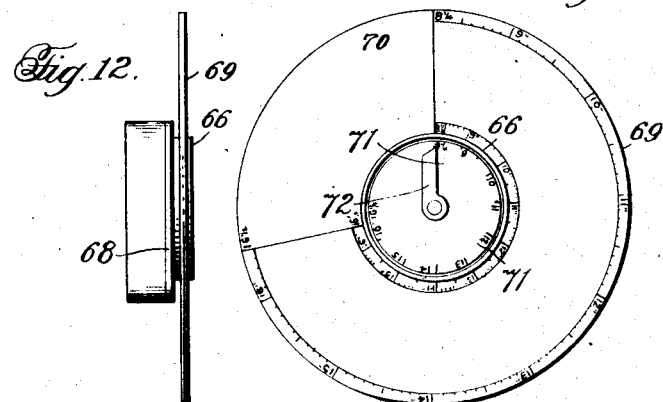
Inventor:
William George Rickman,
By Milans Milans
Attorneys.
Witness:
Jas E. Hutchinson.

Patented Aug. 17, 1926.

1,596,023

UNITED STATES PATENT OFFICE.

WILLIAM GEORGE RICKMAN, OF LONDON, ENGLAND.

DIAPHRAGM INDICATOR FOR CAMERAS.

Application filed August 10, 1922. Serial No. 581,033, and in Great Britain May 9, 1922.

My invention relates to new and useful improvements in camera attachments and more particularly to a device for indicating the reduced light intensity value of the apertures of lenses when used at a considerable extension of the camera.

In the use of lenses for photographing near objects, copying, enlarging, reducing and the like, the camera has to be drawn out beyond the normal focal distance at which objects at infinite distance are in sharp focus, in some cases to such an extent, as for instance when copying the object the same size, that the extension of the camera is double that necessary for objects at infinity distance. The extension of the camera may in some cases be considerably more than this, for instance when making a negative in the camera on an enlarged scale. The rapidity or light intensity value of the apertures of a lens used at such increased focal distance is consequently reduced thereby necessitating, as is well known, a longer exposure, varying as the square of the focal distance.

My invention consists of a device for indicating the diminished light intensity value of the diaphragm numbers on lenses when the camera is extended beyond the normal focal distance at which objects at an infinite distance are in sharp focus, this being done automatically with the extension of the camera, without recourse to measurement or calculation.

Most lenses are now marked with the F/ numbers or the U. S. (uniform system) numbers as follows:—

| Relative exposure required | 1 | 2 | 4 | 8 | 16 | 32 | 64 | 128 | Etc. |
|---|---|---|---|---|---|---|---|---|---|
| F/ Nos | 4 | 5.6 | 8 | 11.3 | 16 | 22.6 | 32 | 45.2 | Etc. |
| U. S. Nos | 1 | 2 | 4 | 8 | 16 | 32 | 64 | 128 | Etc. |

In the case of the F/ system the diameter of the effective aperture of the lens is expressed as a fraction of the normal focal length of the lens, while in the case of the uniform system the aperture of F/4 is taken as the unit and the other apertures are given numbers proportional to the required exposures. Various other systems of marking the diaphragm numbers of lenses have been in use and my invention can be used with any of said systems.

It is the general practice of a photographer when photographing objects requiring a considerable extension of the camera to rack out the camera until the object is sharply focused and then to estimate or measure the distance from the ground glass to the lens, or the nodal point of the same. With this he extends the ratio between the focal length of the lens at infinity and the increased focal distance and then calculates the exposure required therefrom.

With the foregoing in mind, and still other details of arrangement of parts as will be readily understood by workers skilled in the art to which the invention relates, I have illustrated in the accompanying drawings forming a part hereof, the preferred embodiments of the present invention.

In the drawings:—

Fig. 1 is a side elevation showing my attachment in position upon a camera.

Fig. 2 is a top plan of the attachment.

Fig. 3 is a front elevation of the attachment.

Fig. 4 is a horizontal section through the attachment.

Fig. 5 is a front view showing the interior of the attachment with parts shown in section.

Fig. 6 is a detail of the winding reel with one covering plate removed.

Fig. 7 is an elevation of the attaching reel for the end of the cord.

Fig. 8 is a top plan of the reel shown in Fig. 7.

Fig. 9 is an elevation, with the front cover open, and parts in section, of a modified form of the invention.

Fig. 10 is a longitudinal vertical section through the construction shown in Fig. 9.

Fig. 11 is a front elevation of a still further modified form of the invention using a pointer.

Fig. 12 illustrates an end view of a further modified form of the invention, and Fig. 13 shows a front elevation of the construction shown in Fig. 12.

Referring more specifically to the drawings wherein the same reference letters designate like parts in the several views, 1 indicates the bed of a camera, 2 the back section or housing portion, 3 the front section or lens carrying portion, and 4 the bellows, of usual construction, connecting the front and back sections. My attachment is preferably connected to the back section or housing and the cord carried thereby connected to the front section. My attachment comprises a bracket 5 which is adapted to be secured to the side of the back section or housing by means of the screw 6 or other suitable fastening means and a box-like structure 7 which is removably carried by the bracket 5, said box-like structure having on the back thereof a dove-tailed projection 8 adapted to be engaged by the inclined flanges 9 of the bracket. The box 7 has the hinged cover 10 which is provided at its free edge with a spring catch 11 provided with an indentation 12 which forms a projection adapted to be received in a notch or recess 13 formed in the edge of the box. The cover 10 is provided with the elongated opening 14 which is preferably covered by a transparent plate 15 so that the numerals of an indicator, to be later described, may be clearly read. Adjacent the edges of this elongated opening 14 are provided rows of numerals 16 forming a part of the indicator which will operate and may be read in a manner to be later described.

Rotatably mounted within the box 7 is a reel 17 which is provided on the top with a small pinion or cog wheel 18. A cord 19 is secured to the reel, and adapted to be wound thereon, said cord having its inner end secured to the reel by passing its end through the openings 20, formed in the top of the reel, and tying or securing in any other suitable manner. The cord 19 passes through an opening 21 formed in one end of the box and is provided with a stop 22, in the form of a bead or button, to prevent the cord from being wound upon the reel to such an extent as to draw the free end of the cord within the box. The reel 17 is provided upon its spindle 23 with a hook member 24 to which is secured one end of a coil spring 25 which has an elongated opening for the reception of the hook. The opposite end of the spring will be secured to the inner periphery of the reel and the spring is so arranged as to normally tend to hold the cord 19 wound upon the reel but upon withdrawing the cord from the housing, to unwind from the reel, the spring will be placed under tension. A pin 27 is secured in the box 7, adjacent the outer periphery of the reel, and rotatably mounted upon this pin is a sleeve 28 which carries a relatively large cog wheel 29 which is adapted to overlie the reel 17 and mesh with the small pinion or cog wheel 18 carried by the reel. An indicator dial 30 is adapted to be carried by the cog wheel 29 and is preferably formed on its under surface with projections 31 which are adapted to be received in the openings 32 formed in the said cog wheel 29. By this arrangement the indicator dials will rotate with the cog wheel and they may be easily removed and new ones replaced when desired. The projections 31 being received in the openings 32 will prevent the indicator dials from rotating independently of the cog wheel 29. The indicator dials will be provided with a series of rows of numerals to cooperate with the numerals along the edges of the opening in the box cover so that the indicator may be read in a manner which will be later apparent. The end of the cord 19 is preferably formed with an eye 33 which will be engaged by a hook 34 carried by a cord 35 secured to the front section or lens carrying portion of the camera. The cord 35 will be of such a length that when it initially engages the eye 33 the normal diaphragm numbers of the lens at infinity are visible on the indicator dial. The end of the cord 35 opposite to that carrying the hook 34 may be secured to the front section of the camera by tying on in any other desired manner.

In Figs. 7 and 8 I have shown a slightly modified form of the device for securing the end of the cord 35 to the front section of the camera. In this arrangement I provide a regulator wheel 36 rotatably mounted upon a spindle 37, said wheel 36 adapted to have the cord 35 wound thereon. A ratchet wheel 38 is secured to the wheel 36 and is adapted to be engaged by a pawl 39 which is normally held in engagement with the ratchet wheel by means of the spring 40. The pawl 39 is secured to a plate 41, which carries the spindle 37, and is adapted to be secured to the front section of the camera in any desired manner. The cord 35 may be withdrawn from the wheel 36 by releasing the pawl 39 from the ratchet wheel 38 so that the hook 34 may be engaged with the eye 33 of the cord 19. By this construction the cord may be so adjusted, prior to pulling out the front of the camera, so that the normal diaphragm numbers of the lens at infinity are visible on the indicator.

In Figs. 9 and 11 I have shown a slightly modified form of indicator carrying member adapted to be secured to the camera. In this form of the invention I provide a box-like structure 42 having the hinged cover 43 which has a spring catch 44 of the same construction as described for the preferred form of the invention. The cover 43 is also provided with an elongated opening 45 through which the numerals of the indicator may be read in a manner to be later described. Longitudinally spaced rollers 46 and 47 are rotatably mounted in the box 42 and are provided adjacent one end with teeth 48 adapted to engage perforations 49 in an endless belt or apron 50 which operates around the rollers. This endless belt or apron 50 carries an indicator 51 having a plurality of numerals adapted to be read through the opening 45. The roller 47 has secured to its end, outside of the box 42, a cog wheel 52 which is adapted to mesh with a small cog wheel or pinion 53 mounted on a spindle 54 secured to the front face of the box. This small pinion or cog wheel 53 carries a reel 55 upon which a cord 56 is adapted to be wound. It will thus be seen that when the cord is unwound from the reel 55, the pinion or cog wheel 53, meshing with the cog wheel 52 will rotate the drum 47 and thereby operate the belt or apron 50 and the indicator 51 so as to bring different rows of the numbers of the indicator into position beneath the opening 45. In order that the cog wheel 52 may be disengaged from the pinion or wheel 53 the roller 47 is adapted for sliding movement transversely of the box. In order to normally bring the wheel 52 into mesh with the wheel 53 a coil spring 57 surrounds the spindle 58 on the end of the roller 57 between the face of the box and the shoulder of the roller. On the back of the box is provided a dove-tailed projection 58′ which is adapted to engage the bracket secured to the side of the rear section of the camera in the same manner as the preferred form described, so that the box may be detachably connected in position. It will be understood that the cord 56 will be used in the same manner as the cord 19 described in the preferred construction.

In Figure 10 I have illustrated still another modified form of the invention wherein the box or housing, adapted to be detachably secured to the rear section of the camera, is indicated at 59 and is provided in one edge with an opening 60 through which may pass the cord 61 which is adapted to be wound upon a reel, not shown, in the interior of the housing. The reel operates, or rotates, an indicator dial 62 which is visible through an opening 63 formed in the cover 64 and said indicator 62 cooperates with a pointer 65 which is stationary and has the F/ or U. S. (universal system) numbers thereon. As the reel will be constructed in the same manner as that described in the other forms of the invention it is thought that a further detail description thereof or a detail showing thereof is unnecessary. It will be understood that as the cord 61 is unwound from the reel the reel will rotate the dial 62 so as to bring different rows of numerals to cooperate with the numerals upon the stationary hand or pointer 65.

A still further modification is shown in Figs. 12 and 13 in which a ring or flange 66 is formed around an opening 67 in the lid or cover 68 of the box. In this form of the invention an indicator disc or dial 69 is provided with an opening 70 which will receive the ring or flange 66 and thereby mount the disc or dial upon the box. In this form the disc or dial mentioned, which may be known as the exterior disc or dial, may be used either alone or in connection with a smaller interior indicator disc shown at 71 and a pointer 72. Indicator discs or dials having various numerals thereon may be calculated for lenses of various focal lengths and these larger indicating discs or dials will be used for instance in enlarging, copying and reducing. The indicator disc will be placed on the ring or flange 66 so that the figure representing the size of plate to be enlarged is opposite the pointer. The distance is then read off either on the inside or outside rim of the indicator disc and the camera is extended until this distance is shown opposite the pointer on the small interior disc. The camera is then correctly positioned for the enlargement in question, the distance of the enlargement from the lens also being shown on the indicator disc.

From the above detail description it is thought that the construction and operation of the several forms of the invention will be clearly understood. The indicator dials or discs are marked with the diminished light intensity values of the apertures of the lens for every increase of one inch (or other suitable unit or units) in the focal distance up to twice the focal length of the lens in use, or other suitable distances beyond this, if required. The figures may be marked on the indicator clockwise or counter-clockwise, vertically, laterally, radially, circumferentially, spirally or other way. The outer cover of the apparatus is marked with the normal diaphragm numbers of the lens, vertically, laterally, radially, circumferentially, spirally or other way, according to the uniform system or according to the F/ system or any other system or the slot may be marked with the normal diaphragm numbers according to the other system on the other side. The figures on the outer cover are placed so that the diminished light intensity values appearing through the slot may be read off against them, each to the one of which it is the equivalent at the distance to which the camera has been extended. In modified forms of the invention the normal diaphragm numbers of the lens may be arranged upon pointers to operate with rotatable indicator dials marked with the diminished light intensity values of the apertures of the lenses. The cord carried by the reel of the indicator box will be unwound from the reel as the front section, or that part carrying the lens, is extended and said cord may be secured to said front section in any of the ways described above in the detailed description. The length of the cord when attached to the camera front section, may be so adjusted that when taut and the camera is extended to the infinity point, the normal diaphragm numbers of the lens at infinity are visible on the indicator.

A number of indicator cards may be provided, marked with figures representing the diminished light intensity values calculated for the apertures of lenses of different focal lengths thus permitting the device to be used with different lenses. The indicator cards may be removed at will and replaced by lifting up the hinged cover and these cards may also indicate the number of times the focal length of the lens at infinity point is contained in the various increased focal distances; the number of times the exposure required for the aperture at normal focal length has to be multiplied when that aperture is used at the various increased focal distances, the focal distance at each unit extension of the camera beyond infinity point; the exposures required for the different apertures of the lenses at the various increased focal distances, proportionate to the exposure required for copying the same size; the number of times the size of the image of an object on the screen is enlarged or reduced corresponding to the extension of the camera, and the conjugate foci of the lens for each degree of enlargement or reduction, that is to say the distance of the object from the lens (or nodal point of the same) and the distance of the plate or negative from the lens (or nodal point of same); the distance from lens (or nodal point of same) to the object and from the focusing screen or negative to the lens (or nodal point of same) and the different heights of image which an object of a given size, (say the average height of a man, say sixty-eight inches) will produce at different focal lengths; and the distance of projection lens from screen, and size of disc on screen corresponding to different focal distances. This is for lantern or cinematograph projection. These may be shown on separate indicator cards or grouped conveniently together.

In the preferred form of the invention, when desired, the cog wheel 29 may be disengaged from the small pinion or cog wheel 18 by opening the cover and raising said cog wheel 29. In that form of the invention wherein the two rollers are used, as previously stated, the cog wheel 52 may be disengaged from the cog wheel 53 by pushing in on the roller against the tension of the spring 57.

Having fully described my invention what I claim as new and desire to secure by Letters Patent is:

1. The combination with an extensible camera, of means operable by the extension of the camera for indicating the reduced light intensity values of the apertures of the lens.

2. The combination with an extensible camera, of means associated part with the stationary portion and part with the extensible portion for indicating the reduced light intensity values of the apertures of the lens.

3. The combination with an extensible camera, of detachable means associated part with the stationary portion and part with the extensible portion for indicating the reduced light intensity values of the apertures of the lens.

4. The combination with an extensible camera, of an indicator for showing the reduced light intensity values of the apertures of the lens and means for operating the indicator upon the extension of the camera.

5. The combination with a camera including a stationary part and an extensible part, of an indicator for showing the reduced light intensity values of the apertures of the lens connected to one of the parts and means associated with the other part for operating the indicator.

6. The combination with a camera including a stationary part and an extensible part, of an indicator for showing the reduced light intensity values of the apertures of the lens detachably connected to one of the parts and means associated with the other part and detachably connected with the indicator for operating the indicator.

7. The combination with a camera including a stationary part and an extensible part, of a rotatable indicator for showing the reduced light intensity values of the apertures of the lens associated with one of the parts and means associated with the other part for rotating the indicator.

8. The combination with an extensible camera, of means operable by the extension of the camera for indicating the reduced light intensity values of the lens, said means comprising a stationary part marked with the normal diaphragm numbers of the lens and a movable part marked with the diminished light intensity values of the apertures of the lens.

9. The combination with an extensible camera, of an indicator operable by the extension of the camera for indicating the reduced light intensity values of the lens, said indicator comprising a stationary part marked with the normal diaphragm numbers of the lens and a movable part marked with the diminished light intensity values of the apertures of the lens.

In testimony whereof I hereunto affix my signature.

WILLIAM GEORGE RICKMAN.